April 4, 1967  D. A. SHIELLS  3,312,352
FILTER ASSEMBLY HAVING A SUPPORT GRID
Filed Dec. 4, 1963
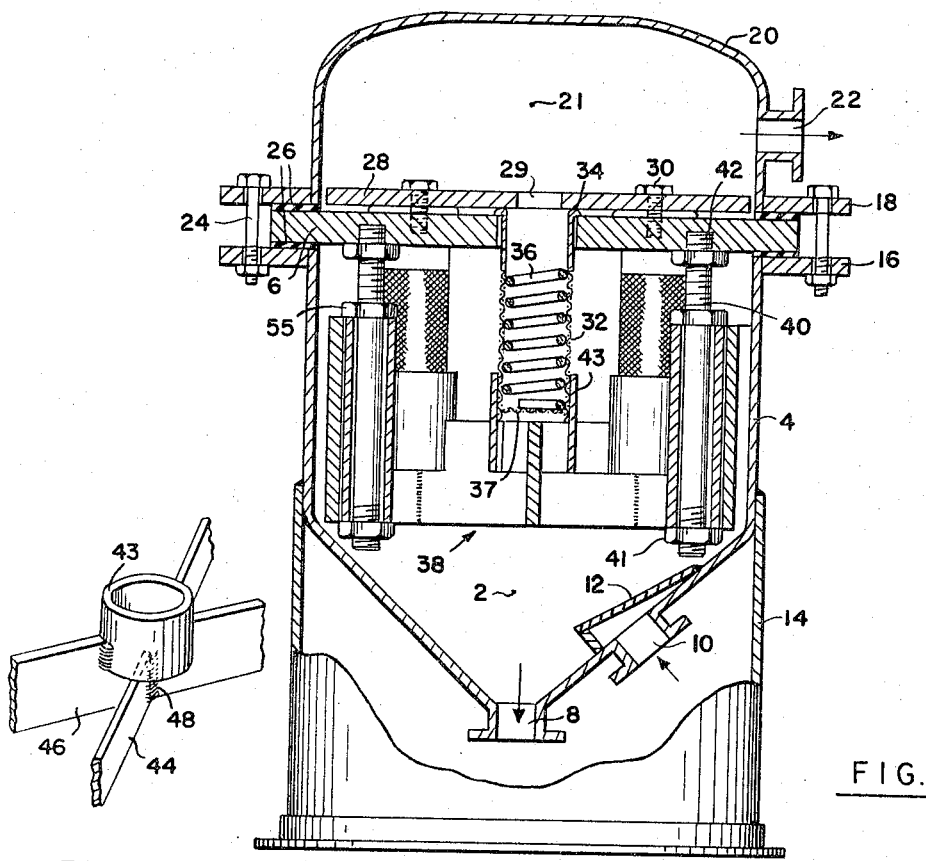
FIG. 1.
FIG. 4.
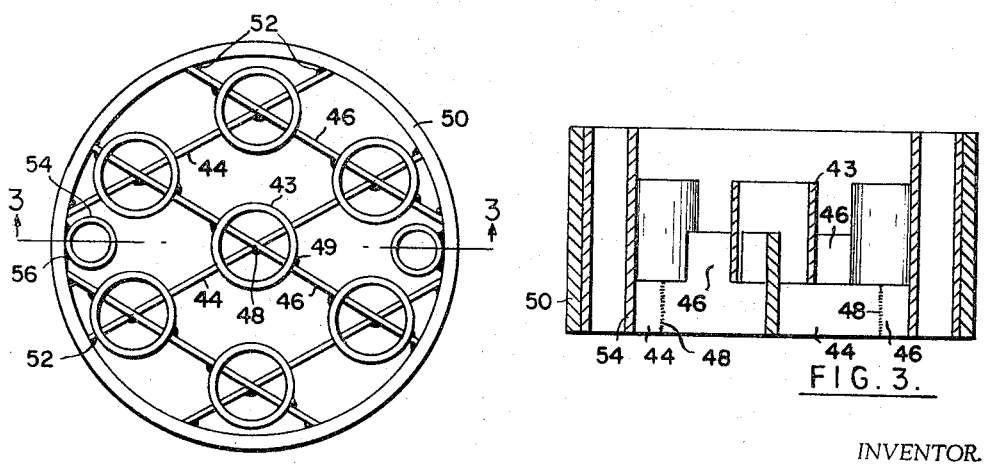
FIG. 2.
FIG. 3.
INVENTOR.
DANIEL A. SHIELLS
BY
ATTORNEYS

United States Patent Office 3,312,352
Patented Apr. 4, 1967

3,312,352
FILTER ASSEMBLY HAVING A SUPPORT GRID
Daniel A. Shiells, San Carlos, Calif., assignor to De Laval Turbine Inc., Trenton, N.J., a corporation of Delaware
Filed Dec. 4, 1963, Ser. No. 328,091
1 Claim. (Cl. 210—323)

This invention relates to filters, and particularly to a structure for supporting filter tubes which is adaptable to a filter employing tubular wire mesh elements suspended from a tube sheet which separates the inlet and outlet chambers of the filter.

In an apparatus such as that described in the patent of Felix and Schneider 3,155,613, dated Nov. 3, 1964, bending of the wire mesh tubes is frequently responsible for failure of the apparatus, which effects filtration of fine suspended particles by pumping the fluid through the tubes which have been coated externally with a porous cake consisting of finely divided particles such as diatomaceous earth. Swirl or cross-flow of the fluid entering the tube nest is also undesirable. Likewise, uneven buildup of filter cake is undesirable. If the filter tubes are close enough to each other so that horizontal motion may cause mutual contact of adjacent tubes, failure caused by tubes wearing holes in each other may occur. Bridging, which involves a buildup of the filter cake during filtering to such an extent that two or more tubular filter elements, bent so that they are abnormally close to each other, are essentially connected thereby, inhibits the backwashing process which involves the flow of fluid downward through the filter tube elements, thus breaking up and eliminating the cake clinging to the tubes. Bridging also tends to block flow during filtration. The principal cause of tube failure is the tendency of diatomaceous earth to become packed against the tube sheet. Frequent replacement of wire mesh filter elements is therefore necessitated.

The primary object of this invention is to provide a substantial increase in the service life of the filter tube elements by increasing the ability of each tube in the filter to resist bending.

Further objects of this invention are to hold each tube in proper position and insure that the space available for the diatomaceous earth cake and influent liquid is constant over the entire length of the tube, to eliminate failure of the tubes due to their wearing holes in each other, and to act as a flow straightener, eliminating undesired cross-flow or swirl of the fluid entering the tube nest, thus increasing the service life.

These and other objects of the invention will become apparent from the following description when read in conjunction with the accompanying drawings in which:

FIGURE 1 is a sectional view of the filter apparatus;
FIGURE 2 is a top view of a tube support grid;
FIGURE 3 is a vertical section on the surface indicated at 3—3 in FIGURE 2; and
FIGURE 4 is a perspective view of a detail.

Referring to FIGURE 1 there is shown a filtering chamber 2 defined by casing 4 and the lower tube sheet member 6. An outlet port 8 at the bottom of casing 4 is provided externally with a valve which can be either manually or automatically controlled to close off the outlet. The casing 4 is also provided with an inlet port 10 which is also externally provided with a valve. Port 10 is covered by a baffle 12 in the interior of casing 4. Casing 4 is welded to a cylindrical mounting 14 which has provision for inlet and outlet pipes communicating with inlet and outlet ports in the casing 4.

Casing 4 is provided at its top with a ring shaped flange 16. A similar ring shaped flange 18 is provided at the lower end of casing 20 which defines the upper chamber 21. Casing 20 is also provided with a port 22. Flanges 16 and 18 are fastened together by means of bolts 24 and separated from each other by lower tube sheet member 6. The lower tube sheet member 6 is provided both above and below with suitable sealing rings 26 compressed between member 6 and flanges 16 and 18. The upper tube sheet member 28, provided with circular holes 29 is fastened to the lower tube sheet member 6 by means of bolts 30.

Each tubular wire mesh filter element 32 is suspended from the tube sheet 6 by virtue of a lip 34 at its upper extremity. The lip 34 is clamped between upper tube sheet member 28 and lower tube sheet member 6. Within the tubular wire mesh element is a helical reinforcing spring 36 engaging the bottom portion 37 of element 32. A supporting grid 38, which will be described shortly hereafter, is suspended from the lower tube sheet element 6 by means of rods 40 and nuts 41. The supporting rods 40 are fastened to lower tube sheet element 6 by means of threads 42 and locking nuts.

Referring to FIGURES 3 and 4 there is shown a cylinder 43 which rests on a cross-member 44 and which is slotted to provide for a cross-member 46. The cross-members 44 and 46 are fastened to each other at welds 48. The cross members 46 are fastened to cylinders 43 at welds 49. The cross-members 44 and 46 are fastened to the grid support ring 50 at welds 52. Rod lugs 54 are fastened to grid support ring 50 at welds 56. Rods 40 extend through lugs 54 and are secured to the grid structure by means of nuts 41 which contact the bottom of the lugs and locking nuts 55 which contact the top of the lugs as is best shown in FIGURE 1. As is best shown in FIGURE 4, members 46 extend above members 44 and slotted cylinders 43 are placed over the upper portion of members 46 only and extend above the upper edge thereof.

Again referring to FIGURE 1, a wire mesh tube 32 is shown inserted into supporting cylinder 43 in such a manner that horizontal motion or swaying of the filter tube 32 will be greatly impeded. The wire mesh filter tubes 32 can be inserted into the supporting cylinders 43 to a distance at which they engage the upper edges of cross-members 46.

The filtering process can be outlined as follows:

With the valve connected to outlet port 8 in a closed condition a precoating fluid consisting ordinarily of a suspension of diatomaceous earth is fed through inlet port 10 and deposited on the exterior of the tubular wire mesh elements 32. The wire mesh filter tubes are now covered with a porous cake which will be referred to as the filter septum. Excess suspension of diatomaceous earth is released through outlet port 8. With the valve associated with outlet port 8 closed, the liquid to be filtered is pumped through inlet port 10 and up into the tube nest. The suspended particles are deposited on or within the pores of the filter septum coating the wire mesh elements and the filtrate flows through the pores of the filter septum, up through the holes provided in the upper tube sheet member 28, into the upper chamber 21 and through the filtrate outlet port 22.

After some time the filter cake builds up to such an extent that filtering can no longer be efficiently accomplished. At this point the filtering operation is stopped, the valve associated with inlet port 10 is closed, the valve associated with outlet port 8 is opened, and fluid is forced under pressure through port 22 into chamber 21. The flow of fluid down through the filter tubes dislodges the built up filter cake which is then discharged through the outlet port 8. The process of precoating the filter tubes with diatomaceous earth is then begun again.

The baffle 12 serves to reduce turbulence within the chamber 2 during the influx of suspension to be filtered.

The flow of liquid is directed by the grid 38 so that swirl, or cross-flow is essentially eliminated. Since the flow of liquid in the tube nest is uniform, the stresses applied to the wire mesh filter tubes are minimized, and the buildup of filter cake is consequently uniform.

This feature of preventing cross-flow is achieved by constructing the grid bars 44 and 46 with a substantial height with respect to the width of the opening formed therebetween. Moreover, at the same time, this construction prevents deflection of the structure while supporting the tubes. If the cylinders 43 were held by means of a wire truss, there would be no stiffness of the structure to resist deflection and there would be no flow straightening guides to prevent cross-flow.

The open structure of the tube support grid as shown in FIGURE 1 permits free flow of liquid upward into the tube nest during the filtering process, and free flow of liquid and solids downward from the tube nest during the backwashing procedure outlined above.

The tube support grid holds the tubes at maximum spacing with respect to each other, thus eliminating bridging which may occur during filtering if backwashing is not performed at required intervals.

It will be evident from the above that various other changes may be made without departing from the invention as described in the following claims.

What is claimed is:

A filter comprising a vessel, a tube sheet within the vessel, a nest of foraminous mesh filter tubes supported by the tube sheet and extending downwardly therefrom to receive inward flow from the vessel, and a grid structure engaging lower portions of said tubes to maintain the tubes vertical and in substantially fixed spaced relationship to each other, said grid structure including a plurality of flat cross bars extending in substantially vertical planes in a criss-cross relationship to define a honeycomb of vertically extending passages at the lower ends of the tubes, said cross bars having a substantial vertical height to prevent cross-flow of fluid flowing vertically upwardly to enter the spaces between the tubes of the tube nest, said grid structure providing a number of intersections of its bars corresponding to the number of tubes and provided with a socket at each intersection receiving the lower end of a corresponding tube.

References Cited by the Examiner

UNITED STATES PATENTS

| | | | |
|---|---|---|---|
| 2,754,005 | 7/1956 | Tursky | 210—308 |
| 2,765,084 | 10/1956 | Tursky | 210—323 |
| 3,143,499 | 8/1964 | Miller | 210—308 X |
| 3,155,613 | 11/1964 | Felix et al. | 210—232 |
| 3,170,873 | 2/1965 | May | 210—323 X |
| 3,225,933 | 12/1965 | Berline | 210—333 |
| 3,244,286 | 4/1966 | Schmidt et al. | 210—333 |

FOREIGN PATENTS 246,461  8/1961  Australia.

REUBEN FRIEDMAN, *Primary Examiner.*

SAMIH N. ZAHARNA, *Assistant Examiner.*